United States Patent [19]

Shore

[11] 3,858,696

[45] Jan. 7, 1975

[54] FORWARD REVERSE DRIVE CONTROL PROVIDING AUTOMATIC BRAKING

[75] Inventor: Daniel B. Shore, Niles, Ill.

[73] Assignee: International Harvester Company, Chicago, Ill.

[22] Filed: May 19, 1972

[21] Appl. No.: 254,966

Related U.S. Application Data

[60] Continuation-in-part of Ser. Nos. 689,549, Dec. 11, 1967, Pat. No. 3,458,018, and Ser. No. 149,853, June 3, 1971, Pat. No. 3,843,205, Division of Ser. No. 830,035, June 3, 1969, Pat. No. 3,606,906.

[52] U.S. Cl. .................................. 192/4 C
[51] Int. Cl. ................................. B60k 29/00
[58] Field of Search ........................ 192/4 C

[56] References Cited
UNITED STATES PATENTS

| | | | |
|---|---|---|---|
| 3,348,644 | 10/1964 | Hilpert | 192/4 C |
| 3,386,523 | 6/1968 | Ruhl | 192/4 C |
| 3,400,790 | 10/1968 | Ruhl et al. | 192/4 C X |
| 3,437,184 | 4/1969 | Wilson | 192/4 C |
| 3,458,018 | 7/1969 | Shore | 192/4 C |
| 3,540,556 | 11/1970 | Sroy | 192/4 C |

*Primary Examiner*—Benjamin. W. Wyche
*Attorney, Agent, or Firm*—John W. Gaines; Floyd B. Harman

[57] ABSTRACT

Tractor having dump valve and forward-reverse drive control employing same, effective to automatically brake the tractor when reversing the tractor's direction of motion. The tractor has brakes, reversible transmission controlled by the dump valve, a range selector valve having a control portion, and a run detector pump to sense direction of rolling movement of the tractor and having a directionalized pump output. The dump valve generally receives, against pressure movable end areas thereof, an output from the range selector valve and directs control pressure to operate the brakes and transmission in alternation to one another and, specifically: receives against the pressure movable end areas the directionalized pump output so as to by hydraulically balanced in a centered position operating the tractor with transmission engaged and brakes disengaged; receives against the pressure movable end areas an unbalancing force from the range selector valve control portion causing the dump valve to shift off center and dump, neutralizing the transmission and setting the brakes; and having valve springs effective to mechanically rebalance the dump valve attendant with slowdown and drop of unbalancing pressure from the run detector pump, causing the dump valve to recenter, releasing the brakes and engaging the transmission in an opposite drive setting.

8 Claims, 8 Drawing Figures

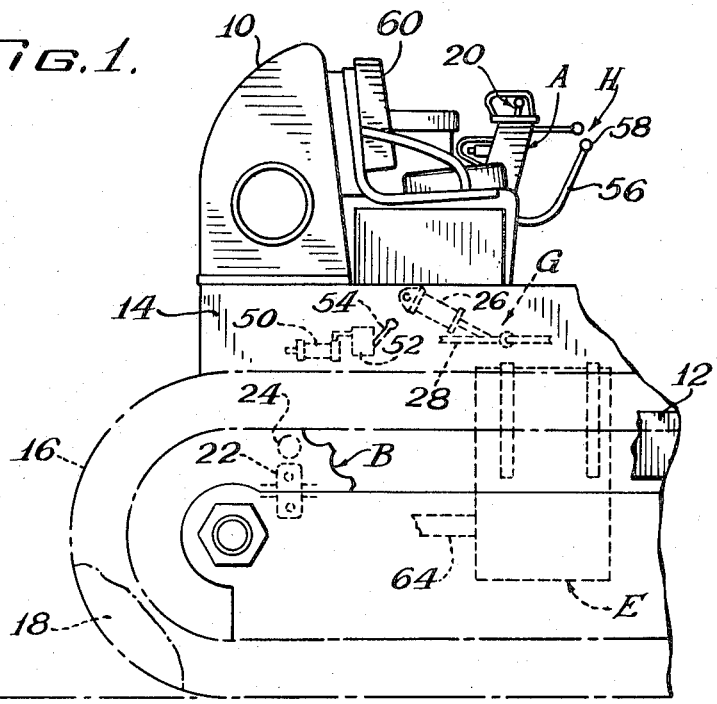
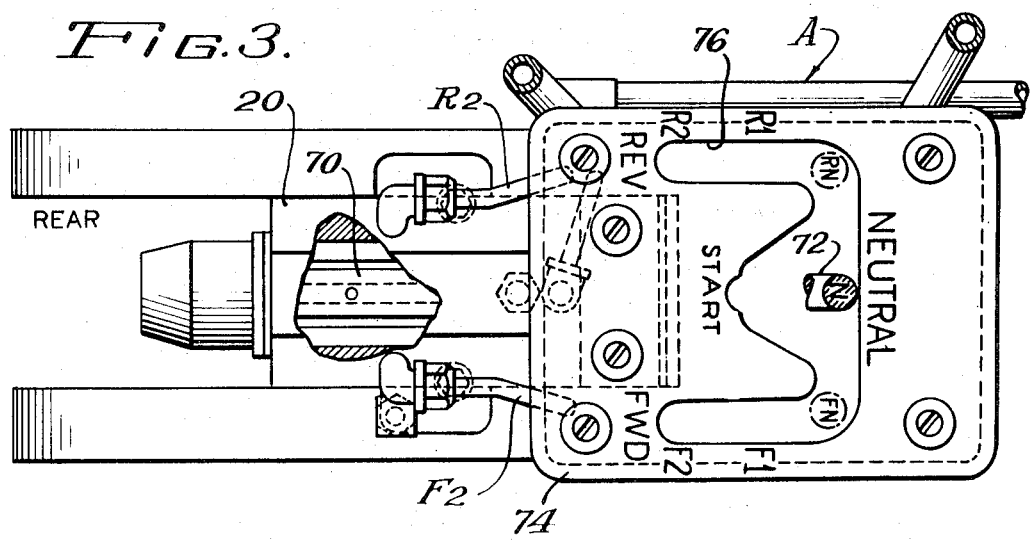

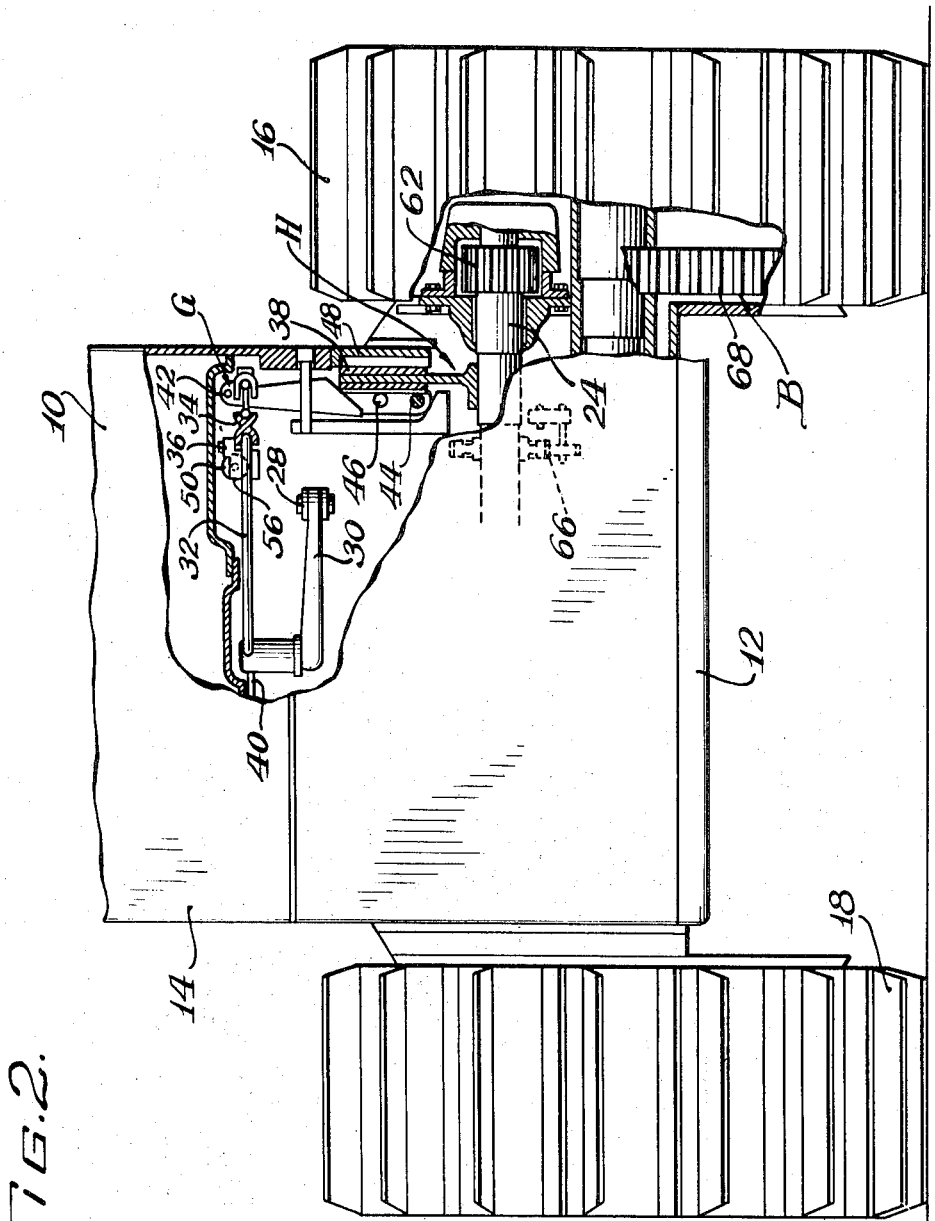

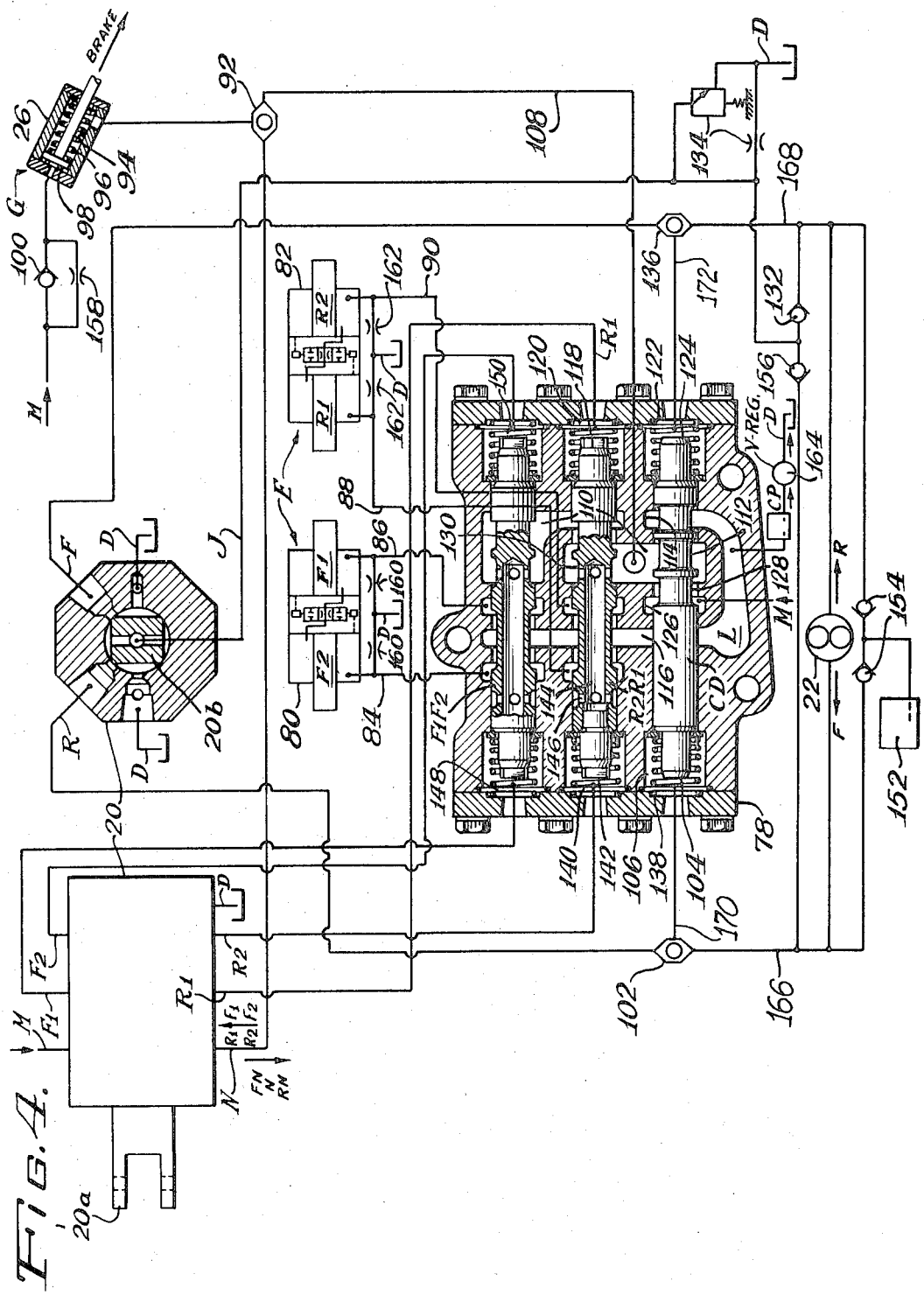

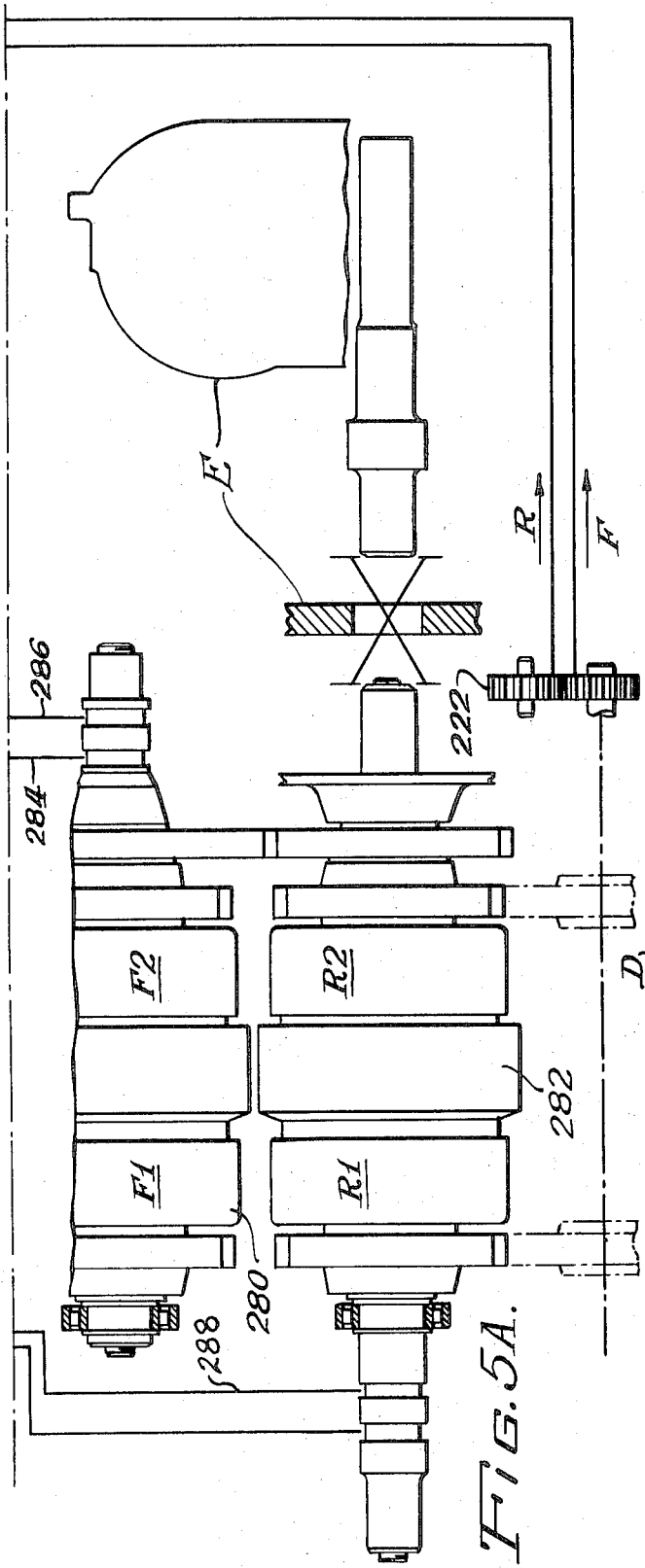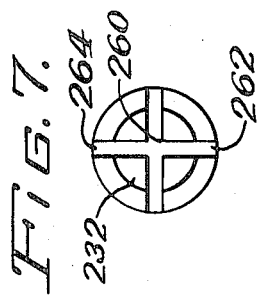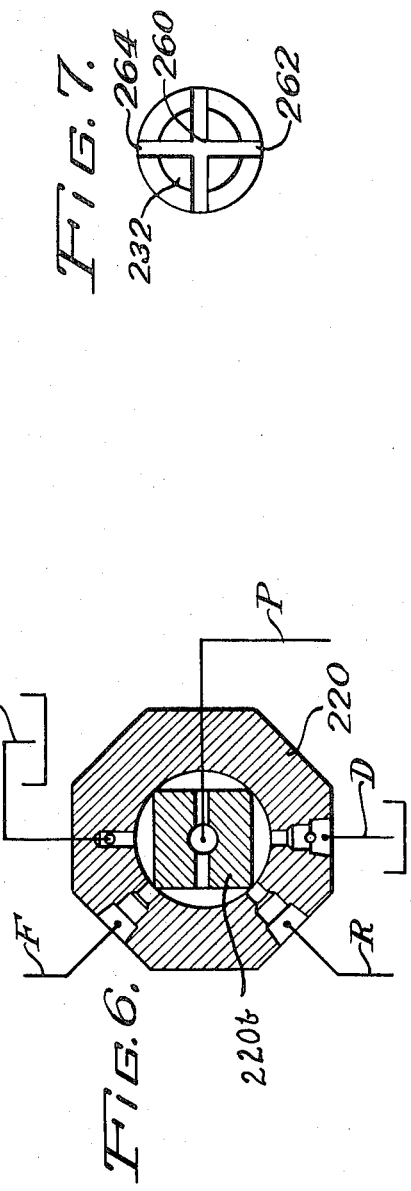

FORWARD REVERSE DRIVE CONTROL PROVIDING AUTOMATIC BRAKING

This application is a continuation in part of Ser. No. 689,549 filed Dec. 11, 1967, now U.S. Pat. No. 3,458,018 and application Ser. No. 149,853 filed June 3, 1971, now Pat. No. 3,843,205 and is a division of the same assignee's case Ser. No. 830,035 filed June 3, 1969 and now Pat. No. 3,606,906.

This invention relates to a vehicle provided with conventional brakes, and to an interacting vehicle transmission provided therein and operated by a forward-and-rear drive control which is provided so that, when being reversed, the transmission at once neutralizes while the brakes are progressively being applied automatically, and subsequently the transmission goes into the opposite or reverse drive setting as and when the brakes have brought the still rolling vehicle to the point at or near standstill, at which point the brakes release automatically without delay.

In the foregoing manner, my invention provides for conditioning of the operating mechanisms in the vehicle so that as each reverse shift is being completed, the take-over shock encountered by the reverse power path through the transmission is materially reduced or substantially eliminated. While the invention is primarily applicable to loaders and industrial construction and agricultural tractors, it has equal application to trucks and other vehicles equipped with a transmission drive, particularly a power shift transmission.

More specifically, I provide pressure-signal-responsive work performing means for applying power to engage and disengage the brakes and to disengage and re-engage the transmission, and a pressure-signal-producing run detector pump responsive to vehicle speed connected to the work performing means to re-engage the transmission and to disengage the brakes when, during a braking phase, the vehicle is substantially at no-run.

Shuttle work to-and-from constitutes such a major part of the utility of industrial construction, agricultural, loader, and like vehicles, that a suitable power shift transmission or hydrostatic transmission is desirable to expedite the speed changes and direction changes that are a frequent necessity to the operator. Problems arise when shuttling many such vehicles because reverse shifting is tedious and time consuming, and very often puts the transmission under undue strain due to shock loading of the reverse power path in effecting the change of direction.

My invention alleviates the foregoing problems. It especially alleviates the situation arising first in the forced reverse shift situation encountered with a power shift transmission and second arising in such a short interval, and without conditioning the operating components of the vehicle, that the strain is excessive, as will now be explained. Features, objects, and advantages will either be specifically pointed out or become apparent when, for a better understanding of the invention, reference is made to the following description taken in conjunction with the accompanying drawings, which show a preferred embodiment thereof and in which:

FIGS. 1 and 2 are right side and rear end elevational views to small scale and large scale, respectively, of a tractor embodying the present invention;

FIG. 3 is a top plan view of a detail of FIG. 1;

FIG. 4 is an hydraulic circuit, illustrated with single lines, of the tractor control system;

Figure 5:
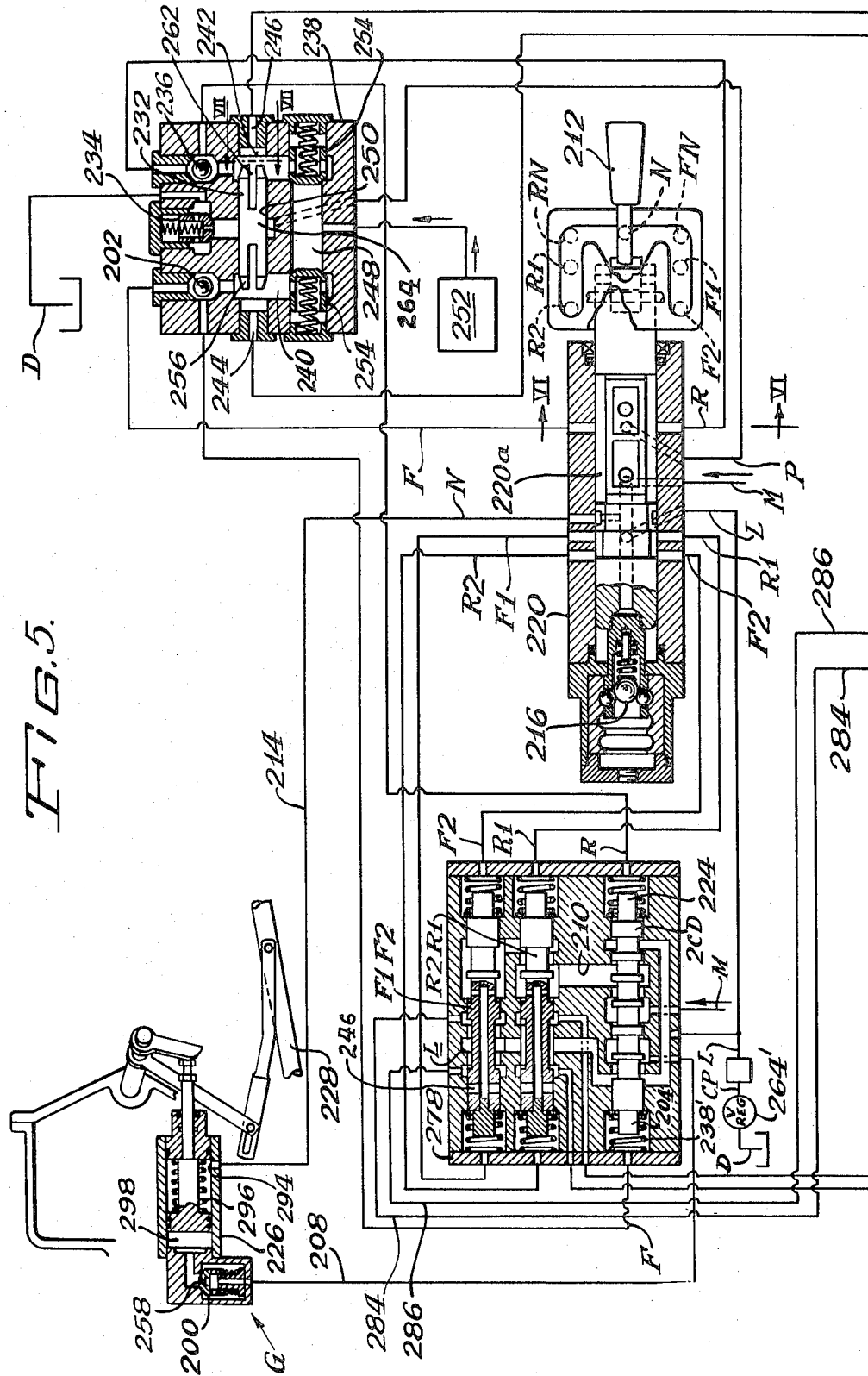

FIGS. 5 and 5A combine to show a circuit modification similar to FIG. 4 and similarly illustrated; and FIGS. 6 and 7 show valve details and are taken along the respective lines VI—VI and VII—VII of FIG. 5.

More particularly in FIG. 1 of the drawings, the rear portion of the illustrative vehicle 10 which is shown in part of a crawler tractor for use in moving, loading, or carrying earth or other material. A longitudinally extending tractor frame 12 carries a body 14 of the vehicle and is carried by left and right longitudinal endless tracks 16 and 18 disposed one on each lateral side of the frame 12. The vehicle 10 proceeds in a straight line so long as the tracks 16 and 18 are driven at the same speed and the vehicle is steered when the speed of the respective tracks differs.

The interacting components providing the essential control parameters according to my invention comprise first, a range selector valve 20 forming part of a transmission range selector control tower A and second, a run detector comprising a transmission signal pump 22 which is connected to the sprocket drive pinion shaft 24 forming part of a sprocket final drive system B. The two components 20 and 22 interact in a varying manner to control a neutralizable transmission system F which drives the vehicle and an automatic power brake cylinder 26 which is connected to a brake linkage 28 forming part of the vehicle braking system G.

By the term neutralizable transmission system F, what I means broadly is any hydrostatic, hydromechanical, or mechanical drive, or a power-shift, friction drive such as includes at least one opposite brake or clutch which remains inactive to reverse the drive until a companion operative brake or clutch has definitely been declutched, all having an effectively de-coupled condition of receiving input and yet transmitting no power output.

BRAKES: MECHANICAL CONNECTIONS—FIGS. 1 AND 2

The brake pedal linkage 28 is actuated by being either drawn forwardly by a brake pedal, not shown, or pushed forwardly by the automatic power brake cylinder 26 to set the brakes of the vehicle braking system G. At the rear, the brake pedal linkage 28 is connected to a brake applying arm 30 which is pulled forwardly when the linkage is actuated. The arm 30 operates in a mechanical path by means of an outwardly moving, push-rod connection 32 and a longitudinal arm 34 of a pivot brake bellcrank 36 to apply a caliper brake against a brake disk 38 in the right sprocket final drive system B to the track 16. Similarly, the arm 30 operates by means of another outwardly moving, push-rod 40 to apply a caliper brake against a brake disk, not shown, connected in the left sprocket final drive system to the track 18. The linkages on both sides are the same, and operate the two caliper brakes simultaneously.

More specifically, the push-rod 32 and bellcrank arm 34 connection pushes outwardly against the upper end 42 of a caliper lever which is pivoted at its lower end on a fixed pivot 44. A shoe, not shown, which is carried by a pivot 46 on the caliper lever is forced against the adjacent brake disk 38 and the reaction is taken by the main case 48 of the final drive.

BRAKES: HYDRAULIC CONNECTIONS—FIGS. 1 AND 2

The brake pedal linkage 28 receives hydraulic assistance from two, transversely aligned pivot cylinders 50, the linkage 28 controlling the cylinders through valves 52 in communication with the respective cylinders and carrying the respective valve operating levers or arms 54. The linkage 28 has a single connection to the two arms 54 jointly so as to operate the cylinders 50 in unison.

As illustrated in FIG. 2, each pivot cylinder bellcrank 36 has a lateral arm 56 in engagement with a pivot cylinder 50. The arms pivot the bellcranks 36 when two cylinders 50 extend, causing engagement of the vehicle braking system G at both sides of the vehicle.

STEERING DRIVE SYSTEM—FIGS. 1 AND 2

Each of the pivot cylinders 50 is part of a series of three hydraulic boosters, there being two such series disposed on at each side of the vehicle for controlling the sprocket drive pinion shaft 24 at the side to steer the vehicle. The valving for the boosters is included among the valves 52, and the arms 54 operate all such valves.

A steering drive system H includes right and left steering levers 56 and 58 which are slightly forward of the operator's seat 60 and which are operated by hand so as to swing fore-and-aft in vertical planes. Each steering lever has a separate connection, not shown, to an arm 54 for operating the steering valving independently. The steering system H also includes each of the brake disks 38 (FIG. 2).

FINAL DRIVE B—FIG. 2

Each of the sprocket drive pinion shafts 24 has one of the brake disks 38 fast thereto, and also a pinion 62 fast thereto. The two pinion shafts 24 are jointly driven by a reversible pinion shaft 64 which the power shift transmission system E drives, and one of the pinion shafts 24 drives the run detector pump 22 by means of intervening gearing 66.

The pinion 62 on each shaft 24 meshes with a bull gear 68 in the final drive B at each side of the vehicle. Depending upon the gear reduction desired, each bull gear 68 can directly drive the drive sprocket of the adjacent track or can be connected to the sprocket by reduction planetary gearing, not shown.

RANGE SELECTOR VALVE—FIG. 3

The body of the range selector valve 20 carries a range spool 70 mounted for rotation and reciprocation therein. A selector lever 72 has a pivot connection at its midportion to the forward end of the range spool 70 and causes the spool 70 to be set in appropriate positions as the lever 72 is moved by the operator among a neutral position indicated at N in solid lines, a forward neutral position indicated at FN in broken lines, a reverse neutral position indicated at RN in broken lines, and respective drive positions F1, F2, R1. and R2 which are opposite similar markings on a slotted gate plate 74 mounted atop the transmission range selector control tower A. The slot 76 in the plate 74 receives and guides the lever 72 and is of a general U shape.

The body of the range selector valve 20 has, in addition to the drain lines indicated at D hereinafter, a set of oil lines connected thereto including lines F2 and R2 as shown, and N, FN, RN, F1, and R1, not shown, the abbreviations being functional drive designations including neutral (N).

CONTROL CIRCUIT—FIG. 4

Regulator valving, now shown, provides main, lube or intermediate, and drain pressure at the respective points abbreviated by their functional designations M, L, and D, previously referred to. For simplificastion, all points and lines designated D can be maintained at the lube pressure L if desired.

The body of the range selector valve 20 is drawn so that it appears at two points in FIG. 4, the range spool according to this manner of illustration being split out and shown in both a longitudinal view 20a and a transverse sectional view 20b for ease in understanding. The range selector valve 20 is connected via a set of transmission valves 78 with directional clutch packs in the transmission system E, specifically, forward and reverse speed packs 80 and 82. The already enumerated set of oil lines interconnects the selector valve 20 and the transmission valves 78, and four service lines 84, 86, 88, and 90 interconnect inlet-outlet ports in the respective transmission valves 78 and the clutch packs 80 and 82 to provide forward and reverse transmission speed settings. Two shafts F1 and R1 extend to establish the low speed forward and reverse drives in the transmission system E, and two shafts F2 and R2 extend to establish high speed forward and reverse drives, respectively. The clutch packs are conventional, neutralizing the existing drive setting without delay and progressively engaging a drive as selected.

In brief, the range selector valve 20, which is a multiposition valve, and the run detector pump 22, which is a reversible pump, produce directionalized pressure signals by which they mutually operate a comparator-dump valve spool CD among the transmission valves 78 to coordinate neutralization of the clutch packs 80 and 82 and transmission, and application of the automatic power brake cylinder 26. In addition to having such coordinated action of nautralization and brake application, the transmission system E and vehicle braking system G also have independent operation for the usual purposes.

INDEPENDENT TRANSMISSION NEUTRALIZATION—FIG. 4

In the neutral setting of the range selector valve 20 wherein the range spool has the position 20a as shown in its longitudinal view and the position 20b as shown in its transverse sectional view, all in solid lines, the four oil lines F1, F2, R1, and R2 are connected in common to, and are at the pressure of, the drain line D.

The neutral line N on the valve 20 and the main pressure line M on the valve are interconnected thereby, and a double check valve 92 leading to the power brake cylinder 26 unseats in a rightward direction such that the oil line N communicates, and sustains main line pressure in, the rod end of the power brake cylinder 26. The force of the pressure in a rod-end chamber 94, coupled with the force of a brake release spring 96 in the chamber, overcomes the force of main line pressure M constantly maintained in the head end chamber 98 of the cylinder 26. Any fluid trapped in the head end is thereby forced through a check valve 100 which unseats to allow the fluid to enter therethrough into the main line M. The brake cylinder 26 is held in the foreshortened, brake release position.

Irrespective of whether the run detector pump 22 is stopped or being operated due to coasting of the vehicle in one direction or the other, there is no further pressure in an active circuit in the hydraulic control and in such condition the transmission system E remains in neutral and the brake system G remains disengaged.

A similar condition obtains with the vehicle either stationary or coasting, when the lever is moved into one of its additional transmission neutral positions RN or FN.

When the vehicle is coasting in either direction, e.g., forwardly, and the range spool is rotated clockwise from the position shown in solid lines 20b so as to take a position to the right corresponding to that same forward direction of the vehicle, no further pressure occurs in an active circuit in the hydraulic control. Coasting of the vehicle in that direction, e.g., forward, when the range spool is rotated leftwardly from the position shown in the solid lines 20b into the counterclockwise reverse-drive position, causes fluid to flow indirectly from the "F" side of the run detector pump 22, through a line J, the valve 20b, a line R, and thence from one direction into a double check valve 102 in the line R and against a pressure movable end area 104 carried by the comparator-dump valve CD and physically located in a pressure operating chamber 106 at that end. The run detector pump also directly applies pressure from a different direction into the double check valve 102 and against the same pressure movable area 104 carried by the comparator-dump valve CD. An opposite pressure movable end area 124 on the valve spool CD is meantime connected by a double check valve 136 to the drain side of valve 20 and to the suction side of the pump 22. The spool CD perforce shifts to the right as viewed in FIG. 4, causing only the right side of the double check valve 92 to be relieved of pressure in a path from the valve 92, through an oil line 108, a gallery-shaped common transfer chamber 110 in the set of transmission valves 78, a spool undercut 112, and thence through a cored cavity 114 into a gallery shaped common lube pressure chamber 116.

So while the transmission has not changed setting, the set of valves 78 has been pre-conditioned for a change due to shift of the spool CD, and the double check valve 92 has been pre-conditioned to change the brake condition because only one side thereof (connected to pressurized oil line N) remains pressurized.

NEUTRALIZATION WITH AUTOMATIC BRAKING—FIG. 4

This situation is made to occur when the preconditioning just described exists, i.e., the vehicle is coasting in one direction, e.g., forward, when the range spool has reached the transition position (RN) corresponding to the opposite vehicle direction. From the latter position, the spool from the position corresponding to the longitudinal view 20a is shifted rightwardly, as seen in that view, into the R1 position also known as low reverse. The only pressurized oil line N connected to the double check valve 92 is vented to drain D through the range selector valve 20, relieving pressure in the rod end chamber 94 of the automatic power brake cylinder 26.

The brake system G is applied because the hydraulically unopposed main pressure in the head end chamber 98 extends the cylinder 26 and, at the same time, the oil line R1 applies main line pressure to a pressure movable right end area 118 carried by the valve R2R1 and located in a pressure operating chamber 120. The valve R2R1 moves leftwardly as viewed in FIG. 4, forming a drain path in which the fluid can flow from the right side of the clutch pack 82, through the line 98, and thence through an undercut 130 to transfer chamber 110 which is maintained at the lube pressure level.

Hence, transmission system F remains in neutral during the deceleration period while the rolling vehicle is being braked by the braking system G.

At some point during the terminal portion of deceleration of the vehicle, speed of the run detector pump 22 decreases until the pump output pressure in the valve end chamber 106 is overcome by the force of a spring 122 surrounding the pressure movable end area 124 presented by the comparator-dump valve spool CD in a pressure chamber receiving the right end of the spool CD. The spool CD mechanically recenters, between the spring 122 and an opposite spring 138 balanced thereby, to its neutral or satisfied position, blocking the cored cavity 114 which is at lube oil pressure and communicating main line pressure to the right end chamber of the reverse clutch pack 82 through a path leading from a cored cavity 126 in the transmission valving 78 which is at main line pressure, through an undercut 128 in the spool CD, the transfer chamber 110, and an undercut 130 in the leftwardly shifted transmission valve spool R2R1, thence through the service line 90 into the directional clutch pack 82 to establish the R1 drive setting. The clutch packs are of well known commercial construction, providing a quick, low pressure slack take up prior to application of full clutch engaging pressure, to minimize shock of engagement.

Simultaneously, the centered valve spool CD causes main line pressure to be applied to the automatic power brake cylinder 26 in a path leading from the cored cavity 126, through the undercut 128, the transfer chamber 110, and the oil line 108, thence through the right side of the double check valve 92 and into the rod end chamber 94 of the cylinder 26 to retract same and release the brake system G.

The vehicle then accelerates to the low speed in the desired opposite direction i.e., R, and perforce the run detector pump 22 reverses direction so that oil flows therefrom in the direction of arrow R in a path leading through a check valve 132, a valve and restriction type, maximum pressure regulating circuit 134, the oil line J, the range spool 20b which occupies a leftward position from the position 20b shown in the solid line sectional view, and the oil line R, thence through the upper half of the double check valve 102 and into the pressure chamber 106.

Simultaneously, oil flows in the direction of the arrow R from the run detector pump 22 through the bottom half of a double check valve 136 to pressurize the pressure movable end area 124 on the valve spool CD.

As a result, the comparator-dump spool CD is hydraulically balanced and also mechanically balanced by the previously described action of the springs 122 and 138, each engaging one end of the spool opposite from the other. This hydraulic and mechanical balance of the spool CD in its satisfied position continues as the reverse speed of the vehicle increases, and will continue to be maintained if the selector valve is advanced into the high speed reverse (R2) position for the purpose of shifting the transmission into high speed reverse drive.

CONVENTIONAL DRIVE CHANGES—FIG. 4

When proceeding rearwardly, the transmission system E is readily shifted for the last mentioned purpose between R1 and R2 positions by reciprocatory movement of the range selector valve 20. The R1 condition has been described, and the R2 condition is attended by main line pressure M being applied by the selector valve 20 through the oil line R2 into a pressure chamber 140. A pressure movable left end area 142 on the spool R2R1 is depressed under pressure, shifting the spool R2R1 to the right from the solid line position as viewed in FIG. 4. Main line pressure is thereupon directed by the valve R2R1 in a path leading from the cored cavity 126, through the undercut 128, the transfer chamber 110, and a longitudinal central passage 144 in the spool R2R1 which is cannelured, a set of radial passages 146, valving 78, thence through the service line 88 into the left chamber of the directional clutch pack 82 so as to cause high speed reverse drive in the transmission system E.

Changes in the forward drive range occur in conventional manner as result of changing the range selector valve 20 between the F1 or F2 positions, thereby applying main line pressure in a pressure chamber 148 or 150 so as to shift the forward valve F1F2 respectively to the right or to the left as viewed in FIG. 4. Main line pressure thus enters through the service line 84 into the left chamber or through the service line 86 into the right chamber of the directional clutch pack 80, the other service line and chamber being connected at the same time to the common lube pressure chamber 116 in the housing of the valves 78.

In either of its directions of rotation, the run detector pump 22 always draws from one oil reservoir 152. One of a pair of seat-to-seat connected check valves 154 unseats to connect the reservoir 152 to the suction side of the pump 22, whereas the other one of the check valves seats to block communication and stop escape of the pumped fluid from the output side of pump 22 back to the reservoir 152.

The check valve 132 unseats in the direction of a symmetrically disposed, alternately operable check valve 156, which valves are connected to the output side of the pump 22. When either valve is unseated to allow pump output fluid to flow into the regulator circuit 134, the other valve stays seated to prevent loss of the regulated pressure back to the suction side of the pump 22.

The regulator circuit 134 provides a continual restricted bleed to drain D from the oil line J and, in addition, prevents the pressure from exceeding a predetermined value irrespective of the speed of the run detector pump 22. At the lower pump speeds, the output falls below a predetermined reduced value, such that spring pressure of either spring 138 or 122 readily overcomes the back pressure created by the circuit 134 and recenters the spool CD.

A restriction 158 which is connected between main line pressure M and the head end chamber 98 of the power brake cylinder 26 insures freedom from abruptness with a gradual application of the brake system G to prevent shock. The restriction 158 is complemented by the check valve 100 hydraulically in parallel therewith, so that the two form a flow-check valve combination. On the other hand, the check valve 100 unseats and bypasses the restriction 158 during the reverse flow causing brake release, so that the brake system G can disengage immediately to expedite vehicle direction changes.

The forward clutch pack 80 has individual restrictions 160 symmetrically connected to the opposite actuating chambers therein so as to provide for a residual oil pressure for lubrication purposes in the chambers at all times. Similarly, the reverse clutch pack 82 has analogously symmetrically connected restrictions 162 for lubrication pusposes, such restrictions all discharging to drain D.

The complete schematic circuit of the present hydraulic control, except for certain novel additions hereof, appears in the same assignee's U.S. Pat. No. 3,386,523, the disclosure of which is incorporated in entirely herein by reference.

In this embodiment of the invention and in the modified embodiment following, novelty is felt to reside in the beneficial results created by the comparator dump valve CD. To illustrate the salient points, let us say that the vehicle 10 is rolling rearwardly. The valve spool CD has three phases of operation while the vehicle is so rolling. In the solid line position shown in FIG. 4, the valve CD in a first phase directs high pressure fluid from the chambers 126 and 110 to the brake cylinder 26 to sustain the cylinder in the foreshortened, brake release position; the valve CD also directs fluid from the chamber 110 through the appropriate transmission valve and into the active end of the selected one 82 of the directonal clutch packs to keep the transmission engaged and sustain rolling of the vehicle rearwardly and under power.

In a second phase, the valve CD has an unbalanced position displaced to the right or to the left from the solid line position shown in FIG. 4, actually to the left under the assumed rearward rolling condition. Such position of the valve CD is attendant with movement of the valve 20 through neutral to a selected forward driving position, whereupon the valve CD dumps the pressure of transfer chamber 110 through the low pressure chamber 114 doing two things. The brakes progressively engage due to the valve CD dumping pressure from the rod end of the brake cylinder 26 which takes its extended, brake-apply position; and the driving clutch pack 82 releases the rearwardly driving clutch therein because the clutch cylinder activating pressure is dumped through the service line 88 or 90 leading to the transfer chamber 110 which is likewise being dumped by the valve CD. The brakes force the coasting vehicle to decelerate.

In the third phase, the valve CD recenters into the balanced position shown in solid liness in FIG. 4, restoring high pressure to the transfer chamber 110. Consequently the brake cylinder 26 goes into the foreshortened brake release position as attained in the first phase above, but a selected clutch in the forward clutch pack 80 is activated under the high, engaging pressure to engage the transmission in forward drive and change the vehicle from the former rearwardly rolling direction to the forwardly rolling direction desired.

The first phase of operation of the valve spool CD described results when control signals from the respective valve 20 and pump 22 hold the spool CD hydraulically in balance from the respective equal and opposite pressure forces on the opposed pressure movable valve areas 104 and 124. The run detector pump 22 applies regulated output pressure to the end area 124 through a direct path including the double check valve 136. The same regulated pump pressure is applied to the opposite area 104 through an indirect path leading through the check valve 132, the line J connected to the valve 20, and the valve 20b which occupies a leftward tilted position from the vertical position as shown in FIG. 4 in solid lines, and thence through the line R and check valve 102 to the area 104.

The second phase of operation of the valve CD when it is shifted leftwardly from the position shown in solid lines in FIG. 4, occurs because of the fact that the prior pressure against area 104 is diverted when the output of the valve 206 is transferred to the line F, in attendance with the fact that the low pressure control signal on the pressure movable area 104 is drained away by the double check valve 102 to the low pressure side of the pump 22 and to the low pressure or drain side of the valve 20.

For its third phase of operation in which the valve spool element CD is recentered to its solid line position as shown in FIG. 4, the pressure area 124 likewise is relegated, by the double check valve 136, to a reduced pressure signal from the output side of the pump 22 and to a reduced signal from the side of the valve 20 supplying the line F. In the third phase, the slow running run detector pump 22 cannot maintain pressure above a predetermined reduced pressure because the restriction in the pressure regulating circuit 134 handles the output unassisted and without build-up of appreciable back pressure across the restriction.

The converse result from the foregoing can readily be visualized, namely, the three similar phases which occur when the vehicle is rolling forwardly under power and the control is reverse to a rear drive position. Circuit symmetry assures such result, the rolling vehicle in either event being immediately declutched and progressively braked, and subsequently being immediately unbraked and progressively clutched to drive in the opposite direction.

It is significant in my invention that the transmission maintains disengagement only a minimum period during reversal of movement, which is valuable under the circumstances of rapid to-and-fro movement such as a crawler vehicle is utilized for. The spring tension in the recentering springs 138 and 122 is such that at a point prior to completion of the braking down of the vehicle, the compressed one of those springs 138 or 122 will overcome the diminishing pressure from the pump 22 and complete the power shift. Thus the selected driving clutch aids in reversing the vehicle direction by a somewhat premature engagement, either with or without assist from the brake cylinder 26 which, at some point, is disengaged completely. This invention in the broad sense contemplates a slight overlap between the selected clutch and the brake cylinder 26 in their operation, all prior to the point at which the vehicle transitorily reaches actual standstill.

It is appreciated from the preceding discussions undr the neutralization headings that retention of the selector lever 72 in each of the three neutral positions, or movement of the lever into but not past the neutral positions results in automatically holding the cylinder 26 in the brake-release position. Yet conventional manual controls remain available to set the brakes under those circumstances, as by pedal actuation or handle (H) actuation, with or without power assist such as from a brake cylinder (not shown) or the cylinders 50 or 26.

A regulator valve 164 (FIG. 4) maintains essentially constant intermediate or lube pressure L in the lube pressure chamber 116 of the valve 78. The valve 156 and one of the valves 154 of the two pairs of check valves concerned have a common inlet-outlet port 166 to which they are connected by an inter-valve communication. The valve 132 and the other valve 154 of the same two respective pairs of valves have a common inlet-outlet port 168 to which they are connected by an inter-valve communication. The pair of valves 132 and 156 have a first outlet J common to them in the valving system.

The double check valve 102 is connected to the same inlet-outlet port 166 and has a second outlet 170 in the system communicating with the fluid inside the pressure chamber 106 in the valve 78. The double check valve 136 is connected to the other inlet-outlet port 168 and has a third outlet 172 communicating with the fluid inside another pressure chamber in the valve 78.

In actual practice, means can be provided for eliminating the double check valve 92, for simplifying the brake operation, and for consolidating the individual double check valves and pairs of check valves in a common check valve unit.

Exemplary of a modified means for accomplishing such is one physically constructed embodiment of the invention as shown according to FIG. 5.

MODIFIED EMBODIMENT—FIG. 5

In the FIG. 5 embodiment, the same functional designations are employed for pressure signals, pressures at points, components, and operating positions of components. Those designations are D, E, G, M, L, P, F, F1, F2, F1F2, FN, N, R, RN, R1, R2, R1R2, R1R2, R2R1, and 220a.

Reference numerals are used corresponding to the preceding embodiment, but differentiated in the present embodiment by the prefix 2, usually in the hundreds' place. The numerals and parts are:

| | |
|---|---|
| Check 200 | Checks 202 |
| Area 204 | Line 208 |
| Transfer 210 | Selector 220 |
| Pump 222 | Area 224 |
| Cylinder 226 | Linkage 228 |
| Shuttle 232 | Regulator 234 |
| Checks 236 | Spring 238 |
| 2 CD | Source 252 |
| Checks 254 | Shuttle 256 |
| Restriction 258 | Line 214 |
| Regulator 264' | Valves 278 |
| Pack 280 | Pack 282 |
| Line 284 | Line 286 |
| Line 288 | Line 290 |
| | Chamber 294 |
| Spring 296 | Chamber 298 |

The double check valve 92 of the preceding embodiment has been eliminated by changing the connections and operation of the brake cylinder (cylinder 226 in this modified embodiment) as will now be pointed out.

In common however in this modified embodiment, the pump 222 hereof, which is bidirectional, produces a single control signal from among one pressure signal R (FIG. 5) and another pressure signal F (FIG. 5) available in its directionalized output which correspond to, respectively, a rearward direction and a forward direction of vehicle movement. Simultaneously, the valve 220, which is a range selector valve, produces a single control signal from among one pressure signal F (FIG. 6) and another pressure signal R (FIG. 6) in its directionalized output which correspond to, respectively, a shift control handle 212 being forwardly and rearwardly shifted in a shift-control and disengageable-transmission means to shift the range selector valve 220. Whenever the single control signals agree, e.g., both the FIG. 5 pump and the FIG. 6 valve produce an F pressure control signal, the valve 2CD, which is a comparator-dump valve, stays centered. The centered valve 2CD applies a non-activating pressure of an intermediate value L to a line 208 leading to the head end of the brake cylinder 226, the brake at that point being held disengaged by a release spring 296 in the cylinder 226.

The brake cylinder 226 operates to set the brakes in response to either coincidence of the two one control signals or coincidence of the two other control signals aforesaid, such as R (FIG. 5) and F (FIG. 6) which cause the valve 2CD to take on off-center position one way or the other. Off center, the valve 2CD applies main line pressure M through the line 208 so as to furnish a brake apply force through the restriction 258 at a low rate into the chamber 298 which is at the head end of the cylinder 226. A brake-set condition is slowly taken.

The brakes have two ways of releasing, depending uponn whether the transmission is undergoing neutralization or reverse engagement. In one way, when the transmission is being neutralized by returning the handle 212 to either the RN, N, or FN positions, the valve 220 in the corresponding one of its neutral positions introduces main line pressure M as a signal through the line 214 leading to the cylinder 226 to apply a brake voiding force in the chamber 294 which it at the rod end of the cylinder. The check 200, which is check valve controlling the head end chamber 298, unseats immediately as the voiding force and the force of the spring 296 overcome the brake apply force, allowing the chamber 298 to be forced empty and the brakes to release immediately.

In the other way, after the shift control handle 212 has been reversely shifted, the valve 2CD eventually centers with gradual slow down of the pump 222, thereupon dumping brake pressure in the line 208 to disengage braking and applying pressure to the transmission to re-engage it in the reversely shifted direction selected.

A detent mechanism 216 retains the valve 220 in the shift position selected.

CONSOLIDATED VALVING—FIGS. 5, 6, 7

A valve unit 238 enables the double check and paired check valves of the system to be consolidated in a common housing.

The consolidated valve unit 238 receives output of the bidirectional pump 222 which the valve unit supplies always as unidirectional flow to the range selector valve 220 (FIGS. 5 and 6) via a line P under pump output pressure P, and which the valve unit supplies always as directionalized flow from the pump to the respective end areas 204 and 224 of the valve 2CD, via checks 202 and 236, which are double check valves in the valve unit 238.

More particularly, the housing of the unit 238 is cored so as to have inlet-outlet ports 240 and 242 therein provided with a space between and with lateral ports proper 244 and 246 each communcating with a different one of the sides of the bidirectional pump 222. The valve 238 has horizontal upstream and downstream bores 248 and 250 which are disposed lengthwise in said space and individual ones of which at each end intersect the inlet-outlet port at that end. The bores 248 and 250 are vertically spaced apart, hydraulically in series, and physically in parallel.

Irrespective of which side of the pump 222 becomes the suction side due to the particular direction of pump rotation, suction fluid in one of two paths leading from the source 252, and thence through the upstream bore 248 and past the appropriate one of the double check valves 254 opened thereby, thereupon flows through the appropriate inlet-outlet port 240 or 242 and the appropriate port proper 244 or 246 to that side of the pump 222 which is the suction side depending upon the pump's direction of rotation.

At the same time, pressure fluid in one of two paths leading to the downstream bore 250 flows thereto through an appropriate one of the inlet-outlet ports 240 or 242 from the pump 222 in correspondence with the different directions of pump rotation, via the appropriate one of ports proper 244 or 246. Fluid circulates in the same way in the previous embodiment but, for brevity's sake, the description was previously omitted.

The shuttle 232 and the shuttle 256 controlling opposite ends of the downstream bore 250 in common form the corresponding ends of a unitary cylindrical plunger 264 having a close sliding fit in the bore 250. The unitary plunger 264 has a solid center section.

In FIG. 7, the shuttle 232 is typical of the respective shuttles 232 and 256 at opposite ends of the unitary plunger 264. Each has four cantilevered, parallel coterminal fingers 260 circumferentially alternating with intersecting, radial slots 262 which uniformly space apart the fingers 260.

The unitary plunger 264 is dynamically unstable in operation and is not in a resting point when in the centered position illustrated in FIG. 5. But it comes to rest both times, whenever taking one of two appropriate endwise-shifted positions wherein either the slots 262 of the shuttle 232 or the corresponding slots of the shuttle 256 communicate pressure fluid to the downstream bore 250 and regulator 234 which is a restrictive, back pressure valve.

EFFECT OF FN POSITION — FIGS. 5-7

The alluded to feature of brake voiding occurs when needed, no matter the circumstances. Let the extreme condition be considered, during coasting when the transmission is neutralized by placing the selector in the opposite range, e.g., FN. More specifically, during a rearward coasting condition of the vehicle, the shift control handle 212 on the transmission selector has no effect when rotated rightwardly to the FN position, in which it causes clockwise movement of the valve 220$b$ from its solid line neutral position as shown in FIG. 6, and downward movement of the selector lever and its handle 212 from their solid line neutral position as shown in FIG. 5.

The pumped fluid consequently as a proper R signal flows through the R line from the run detector pump 222, FIG. 5A, through the lateral port proper 244 and the valve 202, through a long line ending in a terminal F, and thence into a chamber into communication with the pressure movable end area 204 on the valve 2CD. The valve 2CD perforce shifts to the right as viewed in FIG. 5, intercommunicating main line pressure M which is connected to valve 278, with the brake line 208 which is connected to the same valve 278. But the brake system G remains unactuated because of brake voiding pressure present in the rod-end brake chamber 294 at this time. That is to say, fluid in main pressure line M connected to valve 220 in FIG. 5, is directed at the time by the valve spool 220a through neutral line N, line 214, thence into the brake chamber 294. The brake voiding force in chamber 294 and the force of the piston spring 296 therein thus void or negate the brake apply pressure in the head end chamber 298 of the brake cylinder 226, and prevent brake engagement by the latter.

The same effect, i.e., automatic brake voiding of the brake system G, will occur when the shift control handle 212, from neutral, is rotated leftwardly to the RN position during a forward coasting condition of the vehicle.

The foregoing are necessary exceptions to the general rule that brakes are automatically applied during those infrequent instants in which valve 2CD if off center during working conditions. An illustration of that general rule now follows.

EFFECT OF F1 POSITION — FIGS. 5-7

Assume that, prior to being moved to the F1 position, the shift control handle has been occupying an existing R1 position causing rear drive of, the vehicle in low-gear. In that existing R1 condition, pressure directed by selector valve 220, FIG. 5, to valve 278 via line R1, causes the spool R2R1 to shift leftward from the position as shown in solid lines; the thus-shifted spool R2R1 keeps main line pressure M communicated to the clutch actuator for clutch pack R1, by a path leading from M at valve 278, through the transfer passage 210 valve R2R1, thence through a line 288 (FIG. 5A) to the actuator for the clutch pack R1. The valve centering springs surrounding pressure movable end areas 204 and 224 of the spool 2CD are, under the existing condition, keeping the spool 2CD centered-up in the solid line position as shown in FIG. 5.

Assume now that the selector handle 212 and lever are shifted from R1 to F1, in the desired way to reverse the vehicle to forward motion, low gear, by virtue of the lever appropriately sliding, turning, and sliding the selector valve spool (220a FIG. 5; 220b, FIG. 6). The resulting pressure-off in the line R1 between valves 220 and 278, and pressure-on in the line F1 between the same valves 220 and 278, allow the respective spool R2R1 to re-center itself and spool F1F2 to be fluid-pressure-shifted rightwardly from its solid line position as shown in FIG. 5. Also, the resulting clockwise rotation of the valve 220b as viewed in FIG. 6 to its right operating position causes the comparator-dump valve spool 2CD to shift from its solid line position to a position to the right as viewed in FIG. 5.

More specifically, the pump pressure R from run-detector pump 222 is directed through two routes as separate signals applied to the same point (area 204 of valve 2CD) in the system, thus rightwardly shifting valve 2CD. One route leads the proper R signal from pump 222 to valve 238 via line R (FIG. 5A), from inlet-outlet port proper 244 to valve 202 via chamber 240, and from valve 238 to end area 204 of valve 278 via line F. The other of the two routes leads from pump 222 to valve 238 via line R (FIG. 5A), from the lateral port proper 244 to the rightwardly shifted shuttle plunger 264 via inlet-outlet port 240, from shuttle plunger 264 to selector valve 220 via line P, from selector valve 220 to the appropriate F signal line F via the clockwise turned valve spool 220a, thence from signal line F to the end area 204 of valve 278 via ball check valve 202 in valve 238 and the line F connected between valve 238 and spool 2CD.

Hence, the rightwardly shifted spool 2CD depressurizes the transfer passage 210 preventing the prepared clutch circuit (prepared by valve F1F2) from operating, and at the same time the spool 2CD pressurizes line 208 to the brake system G; the brakes are thus set for stopping the vehicle, in the way earlier described in connection with signals R and F.

The shift handle 212 remains in the F1 position and the brakes continue slowing the vehicle until the pump signal R from pump 222 (FIG. 5A) weakens. The opposing springs in the chambers adjacent areas 204 and 224 therefore recenter the comparator-dump value 2CD, doing two things. First, the line 208 vents to drain through the valve 2CD and releases the brakes. Second, the prepared circuit pressurized at 210 by valve 2CD operates the clutch cylinder to engage the forward, low speed drive clutch F1 (FIG. 5A). The transmission 280 thus engages to set the slowing or stopped vehicle into the forward motion desired. More particularly, the path of flow in the prepared circuit to the activated clutch cylinder leads from M at valve 278, FIG. 5, through the transfer passage 210, longitudinally leftwardly through the bore in rightwardly shifted spool F1F2 and out a set of radial passages 246 in spool F1F2, thence through the line 286 (FIGS. 5, 5A) to the cylinder for clutch pack F1.

Accumulating speed of the vehicle in F1 causes the pump 222 (FIG. 5A) to develop a strong F signal, which simply then holds the mechanically centered spool 2CD in a state of hydraulic balance. That is to say, output F from the run-detector pump 222 is being split up at inlet-outlet port 240 in valve 238 and being communicated as equal-and-opposite pressures both in a first path to one end and in a second path to the opposite end of the same comparator-dump valve 2CD. The route for output F is from the pump 222 FIG. 5A, through the line F, thence through the lateral port proper 246 and into the port 242 of valve 238, FIG. 5; the first path into which the proper pump output signal F then splits is from port 242, through the side of double check valve 236, and thence through the line R into contact with the pressure movable area 224 at the right end of comparator-dump valve 2CD. The second path into which the output splits leads from the inlet-outlet port 242, past the leftwardly shifted shuttle valve plunger 264, through a line P connected to selector valve 220 (FIGS. 5 and 5A), from selector valve 220 to the appropriate F signal line F via the clockwise-turned spool 220a, thence from signal line F to the end area 204 of valve 278 via ball check valve 202 in valve 238 and the line F connected between valve 238 and the spool 2CD.

Hence, the brakes remain disengaged and the vehicle continues proceeding in low, forward drive under the transmission setting F1.

The opposite change, required to restore the transmission to the original R1 condition exsiting, can be readily deduced from the foregoing, particularly if reference is made to establishing the R1 condition as previously described in connection with the generally analogous FIG. 4 embodiment.

Also, intra-range changes can be readily deduced from the forgoing, particularly if reference is made to reciprocatory selector valve movement between R1 and R2 as previously described in connection with the FIG. 4 embodiment. Speed shifts in the forward drive range resulting from changing the range selector valve between the F1 and F2 positions are believed to have been adequately described in connection with the analogous FIG. 4 embodiment preceding.

What is claimed is:

1. In means to reduce the change-direction-shock in a vehicle equipped with a signal responsive power brake system which, in response to a brake apply signal, arrests movement of the vehicle in forward and rearward directions of actual movement, which releases in response to a brake voiding signal, and which has two sensing points each for receiving a different one of the respective apply signal and voiding signal communicated thereto, a fluid circuit, a source of high pressure and low pressure fluid for supplying fluid to said circuit, controllable torque transmission means drivable to change the vehicle to a forward or rearward direction of movement desired and operatively receiving fluid of said circuit, and a shift control in said circuit which is forwardly and rearwardly shifted to control direction of drive of the transmission:

the improvement of first valve means (220, 2CD) forming part of said shift control effective to be correspondingly forwardly and rearwardly shifted thereby, and to assume no fewer (N, FN, RN) than one intermediate position of neutral, said first valve means effective to communicate a brake apply signal (208) to one of the sensing points of the brake system; and second valve means forming part of the first valve means effective to communicate (214) a brake voiding signal (N) to the other sensing point of the brake system, when the first valve means assumes at least one neutral position aforesaid.

2. In means to reduce the change-direction-shock in a vehicle equipped with a pressure signal responsive power brake system responsive to a brake apply signal to arrest movement of the vehicle in forward and rearward directions of actual movement and releasable in response to a brake voiding signal, said power brake system having two sensing points each for receiving a different one of the respecting apply signal and voiding signal communicated thereto, a fluid control circuit, a source of high and low pressure for supplying fluid to said circuit, torque transmission means receiving said fluid from the circuit shiftable to change the vehicle to a forward or reverse direction of movement desired, and a shift control in said circuit forwardly and rearwardly shifted to cause the torque transmission means to change the vehicle direction:

the improvement of first valve means (220) forming part of said shift control effective to be correspondingly forwardly and rearwardly shifted thereby, and to assume no fewer (N, FN, RN) than one intermediate position of neutral;

second valve means (2CD) forming part of said shift control hydraulically disposed between the first valve means and said brakes to communicate a brake apply signal to one of the sensing points of said brake system; and third valve means forming part of the first valve means (220) effective to communicate (214) to one point of the brake system a brake voiding signal (N) when the first valve means assumes at least one neutral position aforesaid.

3. The invention of claim 2, the sensing points of the brake system characterized by:

a spring-released brake cylinder with head and rod ends forming the two ends thereof;

means (258) of introducing the communicated brake apply signal to one of said ends against the force of the brake release spring; and means of introducing the communicated brake voiding signal to the other end of the cylinder, augmenting the release spring to provide a combined force overcoming the brake apply signal.

4. In combination:

a control valve assembly comprising a housing having a high, transfer 210, and low pressure chambers;

a common bore intersecting the chambers;

individual valve bores in communication with the transfer and low pressure chambers and with plural service passages in said housing;

first and second range selector valve elements (F1F2, R2R1) each shiftably disposed in a different one of the individual valve bores, said valve elements being movable selectively from a position interconnecting the low pressure chamber and the service passages to discrete operating positions at once interconnecting the transfer chamber and selected service passage and interconnecting the low pressure chamber and the unselected service passages;

a dump valve element (CD) shiftably disposed in said common bore and having an undisplaced, satisfied position interconnecting the transfer and high pressure chambers and a displaced, dump position interconnecting the transfer and low pressure chambers;

means including pressure movable control means carried by the dump valve element for shifting same selectively to make available high pressure to, or to dump the pressure from, the transfer passage and the selected service passage;

utilization means for said control valve assembly comprising a vehicle supported for rolling movement on a horizontal surface;

a run detector pump (22) connected to the vehicle to sense its direction of rolling movement and having a directionalized pump output;

application means including a desired direction selector (20) for controlling application of the pump output in two paths to said pressure movable means carried by the dump valve element each opposing and balancing the other so that said element takes an undisplaced, satisfied position when the direction in which the vehicle is rolling as sensed by the pump is the desired direction;

said application means including the desired direction selector comprising valving including a neutralizable operator operated valve (20, 220) effective to communicate pump output to an unopposed, valve element displacing, pressure movable means carried by the dump valve element when the direction in which the vehicle is rolling as sensed by the pump is undesired;

said dump valve element having means including a control device therefor (138 or 122) effective to restore the dump valve element to the undisplaced, satisfied position, when the pump output falls to or below a predetermined reduced value indicative that rolling of the vehicle in the undesired direction has reached a substantial standstill;

a brake operating cylinder for brakes carried by the vehicle;

a first communication between the brake operating cylinder and said pressure chamber to make available high pressure to, or to dump the pressure from, one end of the cylinder for automatically holding the brakes set with a brake apply pressure when the direction in which the vehicle is rolling as sensed by the pumped is the undesired direction, or for automatically holding the brakes released both when the direction in which the vehicle is rolling as sensed by the pump is the desired direction ann also when the direction in which the vehicle is rolling as sensed by the pump is the undesired direction in the event that the pump output is at or below said predetermined reduced value; and a second communication between the other end of the brake operating cylinder and the operator operated valve (220) to make available a brake voiding signal to the cylinder overcoming said brake apply pressure for automatically holding the brakes released in response to said operator operated valve (220) being in neutral.

5. The invention of claim 4, the first communication including:

orifice means (258) communicating the brake apply pressure to said one end of the cylinder with resistance so as to restrict the rate of brake application; and a check valve (200) communicating the overcome brake apply pressure from said one end of the cylinder and unseating in a direction for immediate brake release.

6. Process to reduce the change-direction-shock in a vehicle which has first means comprising brakes to arrest movement of the vehicle in each of the forward and rearward directions of actual movement, second means comprising a shift-control and disengageable-transmission means having a transmission-disconnect condition preceding each direction change and engageable to drive the vehicle in corresponding directions of movement desired when the control is forward shifted and rearward shifted through or from the control being in neutral, said first means having first and second sensing points controlling operation of the brakes, and signal comparison means (2CD) having first and second comparator points for receiving and comparing signals, said process comprising:

producing a vehicle direction signal comprising a forward vehicle signal when the vehicle is moving forwardly, or a rearward vehicle signal when the vehicle is moving rearwardly, and producing a vehicle control signal comprising a forward control signal when the transmission selector is in forward or a rearward control signal when the transmission selector is in reverse;

simultaneously applying one of said direction signals to one of said comparator points and opposite one of said control signals to one of said comparator points to disconnect the transmission and brake the vehicle with a brake apply force communicated to one sensing point when the vehicle is moving in a direction opposite to the selected transmission drive direction;

production and application of a separate overcoming force to the other sensing point of the first means, corresponding to the control being in neutral in the shift-control and disengageable-transmission means; and operation of the first means to release the brakes responsive to coincidence of said brake apply force and the brake overcoming force in the brakes.

7. The invention of claim 6, the brake apply force with and without said overcoming force having an operation character zed by:

restricted application of the brake apply force alone causing brake-setting at a low rate; and relatively uninhibited concerted action of the brake apply force in being overcome by said overcoming force for brake release at a high rate.

8. The invention of claim 6 the process further comprising:

maintaining a transmission engaged and brake released condition by simultaneously applying one of said direction signals to one of said points and a corresponding one of said control singals to one of said points to keep the transmission engaged and brakes released when the vehicle is moving in the same direction as the selected transmission direction.

* * * * *